(12) United States Patent
Alvarado

(10) Patent No.: US 12,543,637 B2
(45) Date of Patent: Feb. 10, 2026

(54) UNIVERSAL REMOTE CONTROL CONVERSION KIT

(71) Applicant: Omar Alvarado, Gilroy, CA (US)

(72) Inventor: Omar Alvarado, Gilroy, CA (US)

(*) Notice: Subject to any disclaimer, the term of this patent is extended or adjusted under 35 U.S.C. 154(b) by 98 days.

(21) Appl. No.: 17/973,028

(22) Filed: Oct. 25, 2022

(65) Prior Publication Data

US 2024/0130275 A1 Apr. 25, 2024
US 2024/0224848 A9 Jul. 11, 2024

(51) Int. Cl.
*A01D 34/00* (2006.01)
*G05D 1/00* (2006.01)
*G05D 1/222* (2024.01)

(52) U.S. Cl.
CPC ......... *A01D 34/008* (2013.01); *G05D 1/0011* (2013.01); *G05D 1/222* (2024.01)

(58) Field of Classification Search
CPC ..... A01D 34/008; G05D 1/222; G05D 1/0011
See application file for complete search history.

(56) References Cited

U.S. PATENT DOCUMENTS

| | | | | |
|---|---|---|---|---|
| 4,771,840 A * | 9/1988 | Keller | B62B 5/0026 | 280/DIG. 4 |
| 5,439,069 A * | 8/1995 | Beeler | B62D 51/005 | 180/19.1 |
| 5,934,694 A * | 8/1999 | Schugt | B62B 3/1404 | 180/167 |
| 6,220,379 B1 * | 4/2001 | Schugt | B62B 3/1404 | 180/65.1 |
| 6,244,366 B1 * | 6/2001 | Otterson | B62D 51/04 | 180/19.1 |
| 6,880,652 B2 * | 4/2005 | Holtan | B62B 3/1404 | 180/19.2 |
| 7,021,407 B2 * | 4/2006 | Ruschke | B62B 5/0026 | 180/19.1 |
| 7,712,558 B2 * | 5/2010 | Helson | B62B 5/0079 | 180/19.1 |
| 8,360,459 B2 * | 1/2013 | Holtan | B60D 1/02 | 280/495 |
| 11,097,760 B2 * | 8/2021 | Tang | G05D 1/667 | |
| 11,479,284 B2 * | 10/2022 | Lam | G05D 1/028 | |
| 11,648,972 B2 * | 5/2023 | Mallette | B62K 11/10 | 180/14.1 |
| 2005/0098364 A1 * | 5/2005 | Johnson | B62B 3/1404 | 180/65.1 |
| 2010/0078905 A1 * | 4/2010 | Holtan | B62B 5/0006 | 280/47.11 |
| 2011/0109054 A1 * | 5/2011 | Holtan | B62B 5/063 | 280/47.11 |
| 2012/0023887 A1 * | 2/2012 | Messina | B60L 15/20 | 56/320.1 |
| 2012/0029697 A1 * | 2/2012 | Ota | A61G 7/08 | 348/148 |

(Continued)

*Primary Examiner* — Erez Gurari
(74) *Attorney, Agent, or Firm* — The Rapacke Law Group, P.A.; Andrew Rapacke

(57) ABSTRACT

A universal remote control conversion kit including components such as a remote control, battery or batteries, electronic control unit, wheels or drive system, and caster wheel assembly. The kit may be universally adaptable to various traditional push or self-propelled lawn mowers in order to convert said mowers, or utility carts, into remote-controlled units without permanently modifying the mower or cart.

20 Claims, 2 Drawing Sheets

(56) References Cited

U.S. PATENT DOCUMENTS

| | | | | |
|---|---|---|---|---|
| 2012/0320199 A1* | 12/2012 | Kundu | ................... | G06Q 30/06 |
| | | | | 340/568.5 |
| 2013/0128043 A1* | 5/2013 | Avnery | ................... | B60R 1/002 |
| | | | | 348/148 |
| 2014/0062062 A1* | 3/2014 | Ekbote | ................... | B60D 1/40 |
| | | | | 280/478.1 |
| 2015/0032252 A1* | 1/2015 | Galluzzo | ................. | B25J 9/162 |
| | | | | 700/218 |
| 2016/0023675 A1* | 1/2016 | Hannah | .................... | B62B 3/14 |
| | | | | 701/2 |
| 2019/0075722 A1* | 3/2019 | Miller | ................. | A01B 59/048 |
| 2020/0189623 A1* | 6/2020 | Nishizawa | ............. | B66F 9/063 |
| 2020/0375093 A1* | 12/2020 | Matus | ................... | B60W 30/10 |
| 2021/0076561 A1* | 3/2021 | Kiyooka | .............. | G05D 1/0212 |
| 2022/0272902 A1* | 9/2022 | Ma | .......................... | B60L 53/16 |
| 2022/0274655 A1* | 9/2022 | Ma | .......................... | A47L 9/009 |
| 2023/0042867 A1* | 2/2023 | Degnan | ................ | A01D 34/863 |
| 2023/0329143 A1* | 10/2023 | Siebert | ................ | B60W 50/082 |
| 2024/0130275 A1* | 4/2024 | Alvarado | ............... | G05D 1/222 |

\* cited by examiner

UNIVERSAL REMOTE CONTROL CONVERSION KIT

TECHNICAL FIELD

The embodiments provided herein relate to conversion kits for lawn mowers and utility carts to implement remote control functionality.

BACKGROUND

Conversion kits intended to transform traditional push or self-propelled lawn mowers and utility carts into remote controlled units may require permanent modification to an existing lawnmower that may affect or void warranties of the lawn mower. Similarly, lawnmower conversion kits may often require removal of desirable features such as grass clipping catch bags, or the like.

There is a need for a conversion kit designed to convert traditional lawn mowers and utility carts into remote control operated units without losing features or functionalities of the lawnmower and utility carts or threatening manufacturer or warranties associated with the lawn mower.

SUMMARY OF THE INVENTION

This summary is provided to introduce a variety of concepts in a simplified form that are disclosed further in the detailed description of the embodiments. This summary is not intended to identify key or essential inventive concepts of the claimed subject matter, nor is it intended for determining the scope of the claimed subject matter.

The embodiments provided herein relate to a universal remote control conversion kit including components such as a remote control, battery or batteries, electronic control unit, wheels or drive system, frame, and utility cart. The kit may be universally adaptable to various traditional push or self-propelled lawn mowers and utility carts.

The embodiments provided herein relate to a universal remote control conversion kit including a front caster assembly, left and right motorized wheels, electronic control unit (ECU), power source (such as batteries), and a remote control adapted to operably communicate with the electronic control unit to drive the left and right motorized wheels. The kit may allow for remote control operation of the lawn mower while maintaining grass-clipping bagging or catching functionality.

The embodiments provided herein relate to a universal remote control conversion kit including a utility cart including a front caster assembly, left and right motorized wheels, ECU, power source (such as batteries), and a remote control adapted to operably communicate with the ECU to drive the left and right motorized wheels.

Other illustrative variations within the scope of the invention will become apparent from the detailed description provided hereinafter. The detailed description and enumerated variations, while disclosing optional variations, are intended for purposes of illustration only and are not intended to limit the scope of the invention.

BRIEF DESCRIPTION OF THE DRAWINGS

A more complete understanding of the embodiments, and the attendant advantages and features thereof, will be more readily understood by references to the following detailed description when considered in conjunction with the accompanying drawings wherein.

Figure 1:
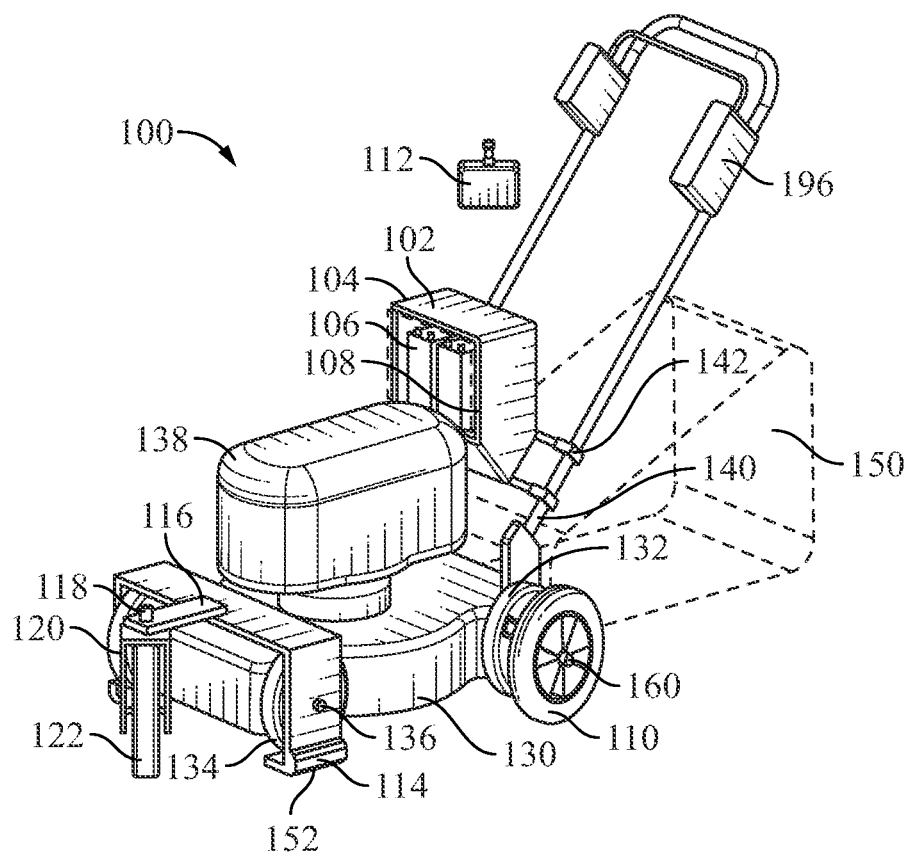
FIG. 1 illustrates a perspective view of a universal remote control conversion kit according to some embodiments.

The drawings are not necessarily to scale, and certain features and certain views of the drawings may be shown exaggerated in scale or in schematic in the interest of clarity and conciseness.

DETAILED DESCRIPTION

The specific details of the single embodiment or variety of embodiments described herein are set forth in this application. Any specific details of the embodiments are used for demonstration purposes only, and no unnecessary limitation or inferences are to be understood therefrom.

Before describing in detail exemplary embodiments, it is noted that the embodiments reside primarily in combinations of components related to the system and kit. Accordingly, the device components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

In general, the embodiments described herein relate to a universal remote control conversion kit including a front caster assembly including a caster frame and caster wheels pivotably attached thereto. According to some embodiments, multiple wheels may be attached to the caster frame to allow the wheel(s) to rotate or pivot. The universal remote control conversion kit may include left and right motorized wheels which may include wheels having electric motors integrated therein to turn the left and right wheels, or an external electric motor(s) operably connected to the left and right wheels to turn said wheels.

The universal remote control conversion kit may include an ECU or electronic control module integrated with the system and in operable communication with a power source and the electric motor(s) or motorized wheel(s). The ECU may include at least one printed circuit board (PCB) including a controller or processor in operable communication with at least one memory for storing instructions. The ECU may include a computing device operatively coupled to receive data from or transfer data to, or both, one or more data storage devices. The universal remote control conversion kit may include a remote control, for example, a handheld radio wave transmitter, in operable communication with a receiver in communication with the electronic control unit, such as by wireless communication including radio transmission, to drive the left and right motorized wheels and, according to some embodiments, additional electric motors or actuators to turn or drive the caster wheel(s). The remote control may communicate with the receiver or ECU via wireless technology such as, but not limited to, radio, short-range wireless technologies, wireless local area network, cellular data communications, or the like.

In reference to FIG. 1, a universal remote control conversion kit 100 may include an ECU 104 including an ECU housing 102 defining a cavity to house at least one power source 106 and at least one controller 108 in operable communication with the at least one power source 106. The ECU 104 may be removably attachable to a lawn mower 130 via an attachment assembly 142, the mower or utility carts 130 having a motor or engine 138, rear mower wheel(s) 132, front mower wheel(s) 134, bagging assembly 150, and drive engage mechanism 196 constructed and arranged to actuate drive mechanisms within a self-propelled lawn mower. The universal remote control conversion kit 100 may allow for disconnection of the drive engage mechanism 196 from the self-propelled lawn more without altering operation of the universal remote control conversion kit 100.

The ECU 104 may be in operable communication with at least one drive motor 160 integrated within at least one wheel 110. The at least one wheel 110 and integrated drive motor 160 may be mountable to at least one mower wheel 132, to the axle of the mower wheel 132, or to the body of the mower 130 such that the at least one wheel 110 and integrated drive motor 160 may propel the mower when communicated from the remote 112 to the ECU 104.

The universal remote control conversion kit 100 may include a caster frame 114 constructed and arranged to attach towards the front of a lawn mower to facilitate steering the lawn mower via the universal remote control conversion kit 100. The caster frame 114 may attach, for example, to the front axle 136 of the lawn mower. The caster frame 114 may include an arm 116 extending from the caster frame 114, and rotatably connected to a caster wheel or wheels bracket 120 via rotational joint 118. A caster wheel 122 may be rotatably connected to the caster wheel bracket 120. According to some embodiments, a steering motor (not shown) may be integrated within the caster frame and caster wheel, which may be in operable communication with the ECU in order to control rotating and steering of the caster wheel and lawn mower.

The universal remote control conversion kit 100 may further include a remote control 112 in operable communication with the ECU 104.

Figure 2:
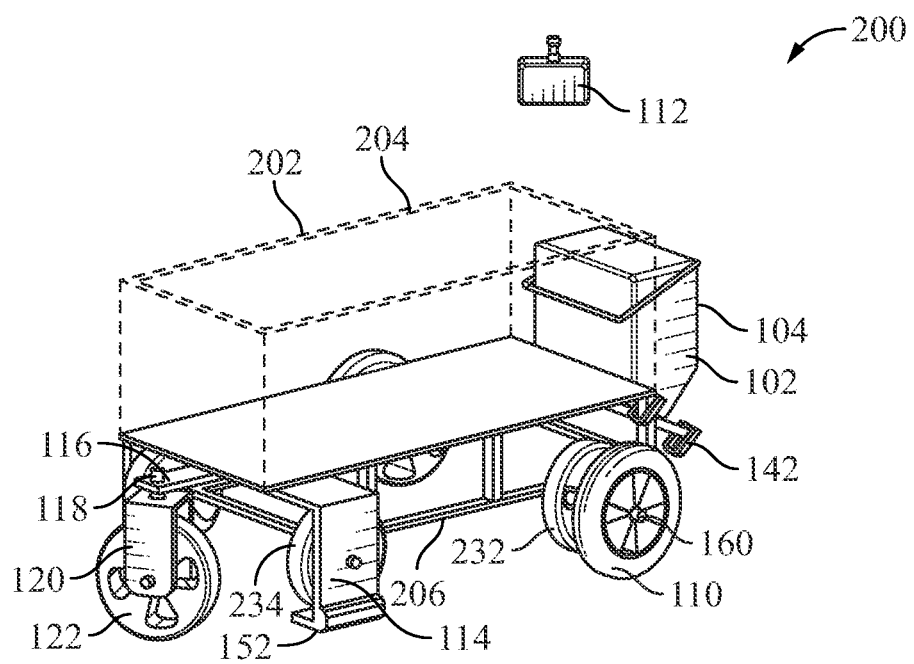
FIG. 2 illustrates a perspective view of a universal remote control conversion kit according to some embodiments.

In reference to FIG. 2, a universal remote control conversion kit 200 may include an ECU 104 including an ECU housing 102 housing at least one power source and at least one controller in operable communication with the at least one power source. The ECU 104 may be removably attachable to a utility cart 202 via an attachment assembly 142, the utility cart 202 having a body 204, rear wheel(s) 232, front wheel(s) 234, and frame 206. The ECU 104 may be in operable communication with at least one drive motor 160 integrated within at least one wheel 110. The at least one wheel 110 and integrated drive motor 160 may be mountable to at least one wheel 232, to the axle of the wheel 232, or to the frame 206 of the cart 202 such that the at least one wheel 110 and integrated drive motor 160 may propel the cart when communicated from the remote 112 to the ECU 104. The universal remote control conversion kit 200 may further include a remote control 112 in operable communication with the ECU 104.

The universal remote control conversion kit 200 may include a caster frame 114 constructed and arranged to attach towards the front of a cart to facilitate steering the cart via the universal remote control conversion kit 200. The caster frame 114 may attach, for example, to the cart frame 206 of the cart. The caster frame 114 may include an arm 116 extending from the caster frame 114, and rotatably connected to a caster wheel bracket 120 via rotational joint 118. A caster wheel 122 may be rotatably connected to the caster wheel bracket 120. According to some embodiments, a steering drive motor (not shown) may be integrated within the caster frame and caster wheel, which may be in operable communication with the ECU in order to control rotating and steering of the caster wheel and lawn mower or utility cart.

Figure 3:
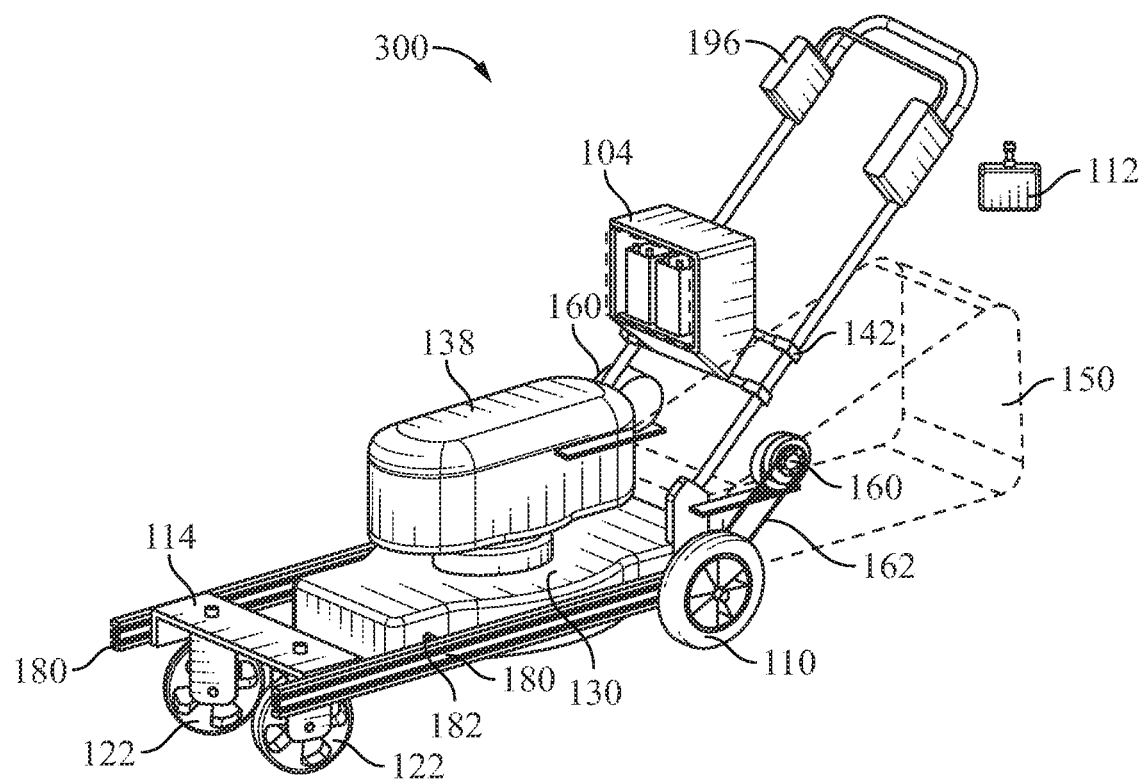
FIG. 3 illustrates a perspective view of a universal remote control conversion kit according to some embodiments.

Referring to FIG. 3, a universal remote control conversion kit 300 may include an ECU 104. The ECU 104 may be removably attachable to a lawn mower 130 via an attachment assembly 142. The mower 130 may include a motor or engine 138, bagging assembly 150, and drive engage mechanism 196 constructed and arranged to actuate drive mechanisms within a self-propelled lawn mower. The universal remote control conversion kit 300 depicted in FIG. 3 may be constructed and arrange to replace the wheels of the mower.

The ECU 104 may be in operable communication with at least one drive motor 160 in operable communication with at least one wheel 110 via a chain, band, drive shaft, or other drive mechanism 162. The at least one wheel 110 and integrated drive motor 160 may be mountable to the mower 130 body such that the at least one wheel 110 and integrated drive motor 160 may propel the mower when communicated from the remote 112 to the ECU 104. Alternatively, the at least one wheel 110 and integrated drive motor 160 may be mountable to a chassis 180 mounted to the mower 130 body such that the at least one wheel 110 and integrated drive motor 160 may propel the mower when communicated from the remote 112 to the ECU 104. The chassis 180 may mount to the mower 130 body at the mower front and rear axles or directly to the mower 130 body. The chassis may include a left and right chassis 180, mounted to the left and right sides of the mower 130 body, respectively.

The universal remote control conversion kit 300 may include a caster frame 114 constructed and arranged to attach towards the front of a lawn mower to facilitate steering the lawn mower via the universal remote control conversion kit 100. As seen in FIG. 3, the caster frame 114 may be attached to the chassis 180. The caster frame 114 may attach, for example, to a first chassis and a second chassis disposed on either side of the mower 130. The caster frame 114 may be rotatably connected to at least one caster wheel bracket via at least one rotational joint. At least one caster wheel 122 may be rotatably connected to the caster wheel bracket 120. According to some embodiments, a steering drive motor (not shown) may be integrated within the caster frame and caster wheel, which may be in operable communication with the ECU in order to control rotating and steering of the caster wheel and lawn mower. The universal remote control conversion kit 300 may further include a remote control 112 in operable communication with the ECU 104.

Figure 4:
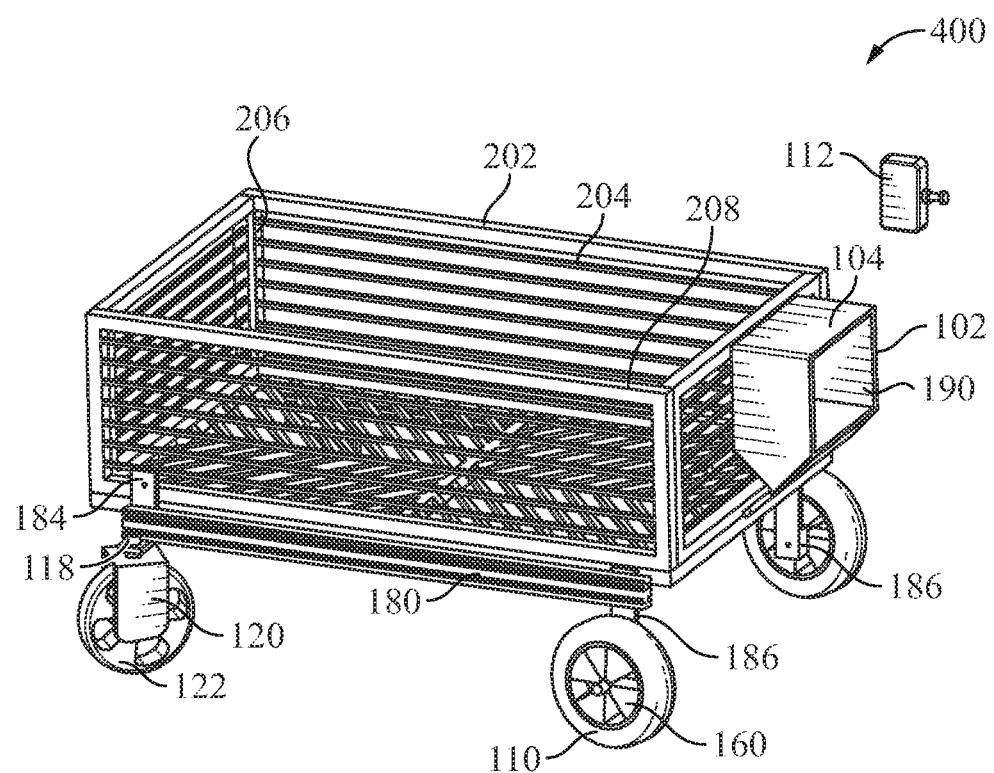
FIG. 4 illustrates a perspective view of a universal remote control conversion kit according to some embodiments.

Referring to FIG. 4, a universal remote control conversion kit 400 a universal remote control conversion kit 300 may include an ECU 104 including an ECU housing 102 defining a cavity 190. The ECU 104 may be removably attachable to a utility cart 202 via an attachment assembly, the utility cart 202 having a body 204 and frame 206 to define an open cavity 208 for holding items therein.

The ECU 104 may be in operable communication with at least one integrated drive motor 160 in operable communication with at least one wheel 110. The at least one wheel 110 and integrated drive motor 160 may be mountable to the cart 202 via attachment brackets 184, 186 such that the at least one wheel 110 and integrated drive motor 160 may propel the cart when communicated from the remote 112 to the ECU 104. Alternatively, the at least one wheel 110 and integrated drive motor 160 may be mountable to a chassis 180 mounted to the mower or utility cart 130 body such that the at least one wheel 110 and integrated drive motor 160 may propel the cart when communicated from the remote 112 to the ECU 104. The chassis 180 may include a left and right chassis 180, mounted to the left and right sides of the cart body, respectively.

At least one caster wheel 122 may be rotatably connected to the caster wheel bracket 120 which may be rotatably attached to the chassis 180 or the attachment brackets 184, 186 at joint 118. According to some embodiments, a steering drive motor (not shown) may be integrated within the caster wheel bracket and caster wheel, which may be in operable communication with the ECU in order to control rotating and steering of the caster wheel and lawn mower or utility cart. The universal remote control conversion kit 300 may further include a remote control 112 in operable communication with the ECU 104.

The following description of variants is only illustrative of components, elements, acts, product and methods considered to be within the scope of the invention and are not in any way intended to limit such scope by what is specifically disclosed or not expressly set forth. The components, elements, acts, product and methods as described herein may be combined and rearranged other than as expressly described herein and still are considered to be within the scope of the invention.

According to variation 1, a universal remote control conversion kit may include an ECU including ECU housing defining a cavity; at least one power source disposed within the cavity; at least one controller disposed within the cavity and in operable communication with the at least one power source; a remote control in operable communication with the ECU; at least one wheel; at least one drive motor in operable communication with the ECU and being constructed and arranged to drive the at least one wheel; an attachment assembly constructed and arranged to removably attach the ECU to at least one of a lawn mower or utility cart; a caster frame constructed and arranged to attach to the front of at least one of a lawn mower or utility cart to facilitate steering the at least one of a lawn mower or utility cart, wherein the caster frame includes a at least one arm extending from the caster frame and rotatably connected to at least one caster wheel bracket via a rotational joint; and at least one caster wheel rotatably connected to the at least one caster wheel bracket.

Variation 2 may include a universal remote control conversion kit as in variation 1, wherein the ECU further includes at least one memory in operable communication with the controller.

Variation 3 may include a universal remote control conversion kit as in any of variations 1 through 2, further including a steering motor integrated within the caster frame and caster wheel, the steering motor being in operable communication with the ECU and being constructed and arranged to turn the caster frame.

Variation 4 may include a universal remote control conversion kit as in any of variations 1 through 3, wherein the at least one drive motor is integrated within the at least one wheel.

Variation 5 may include a universal remote control conversion kit as in any of variations 1 through 4, wherein the at least one wheel is a plurality of wheels.

Variation 6 may include a universal remote control conversion kit as in any of variations 1 through 5, wherein the at least one drive motor is a plurality of drive motors integrated within the plurality of wheels.

Variation 7 may include a universal remote control conversion kit as in any of variations 1 through 6, wherein the at least one arm extending from the caster frame is a plurality of arms extending from the caster frame.

Variation 8 may include a universal remote control conversion kit as in any of variations 1 through 7, wherein the at least one caster wheel bracket is a plurality of caster wheel brackets.

Variation 9 may include a universal remote control conversion kit as in any of variations 1 through 8, wherein the at least one caster wheel is a plurality of caster wheels rotatably connected to the plurality of caster wheel brackets.

Variation 10 may include a universal remote control conversion kit as in any of variations 1 through 9, wherein the at least one power source is at least one battery.

Variation 11 may include a universal remote control conversion kit as in any of variations 1 through 10, further including a drive mechanism constructed and arranged to communicate at least one of drive motor power or torque to the at least one wheel.

According to variation 12, a universal remote control conversion kit may include an ECU including ECU housing defining a cavity; at least one power source disposed within the cavity; at least one controller disposed within the cavity and in operable communication with the at least one power source; at least one memory disposed within the cavity in operable communication with the controller; a remote control in operable communication with the ECU; at least one wheel; at least one drive motor in operable communication with the ECU and being constructed and arranged to drive the at least one wheel via at least one drive mechanism; an attachment assembly constructed and arranged to removably attach the ECU to at least one of a lawn mower or utility cart; a caster frame constructed and arranged to attach to the front of at least one of a lawn mower or utility cart to facilitate steering the at least one of a lawn mower or utility cart, wherein the caster frame includes a at least one arm extending from the caster frame and rotatably connected to at least one caster wheel bracket via a rotational joint; at least one caster wheel rotatably connected to the at least one caster wheel bracket; and at least one chassis constructed and arranged to facilitate attachment of the at least one wheel and caster frame to the at least one of a lawn mower or utility cart.

Variation 13 may include a universal remote control conversion kit as in variation 12, wherein the at least one chassis is at least two chassis.

Variation 14 may include a universal remote control conversion kit as in any of variations 12 through 13, wherein the caster frame is joined between the at least two chassis.

Variation 15 may include a universal remote control conversion kit as in any of variations 12 through 14, wherein the at least one arm extending from the caster frame is a plurality of arms extending from the caster frame, Variation 16 may include a universal remote control conversion kit as in any of variations 12 through 15, wherein the at least one caster wheel bracket is a plurality of caster wheel brackets.

Variation 17 may include a universal remote control conversion kit as in any of variations 12 through 16, wherein the at least one caster wheel is a plurality of caster wheels rotatably connected to the plurality of caster wheel brackets.

Variation 18 may include a universal remote control conversion kit as in any of variations 12 through 17, further including a plurality of attachment brackets constructed and arranged to facilitate attachment of at least one chassis to a lawn mower or utility cart.

Variation 19 may include a universal remote control conversion kit that may include an ECU including ECU housing defining a cavity; at least one power source disposed within the cavity; at least one controller disposed within the cavity and in operable communication with the at least one power source; at least one memory disposed within the cavity in operable communication with the controller; a remote control in operable communication with the ECU; a plurality of wheels; a plurality of drive motors in operable communication with the ECU and being constructed and arranged to drive the plurality of wheels via at least one drive mechanism; an attachment assembly constructed and arranged to removably attach the ECU to at least one of a lawn mower or utility cart; a caster frame constructed and arranged to attach to the front of at least one of a lawn mower or utility cart to facilitate steering the at least one of a lawn mower or utility cart, wherein the caster frame includes a at least one arm extending from the caster frame and rotatably connected to at least one caster wheel bracket via a rotational joint; at least one caster wheel rotatably connected to the at least one caster wheel bracket; at least one chassis constructed and arranged to facilitate attachment of the at least one wheel and caster frame to the at least one of a lawn mower or utility cart; and a plurality of attachment brackets constructed and arranged to facilitate attachment of at least one chassis to a lawn mower or utility cart.

Variation 20 may include a universal remote control conversion kit as in variation 19, wherein the universal remote control conversion kit is constructed and arranged to non-permanently convert at least one of a lawn mower or utility cart into a remote-controlled unit.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the present embodiment is not limited to what has been particularly shown and described hereinabove. A variety of modifications and variations are possible in light of the above teachings without departing from the following claims.

What is claimed is:

1. A universal remote control conversion kit, comprising:
an ECU comprising ECU housing defining a cavity;
at least one power source disposed within the cavity;
at least one controller disposed within the cavity and in operable communication with the at least one power source;
a remote control in operable communication with the ECU;
at least one wheel;
at least one drive motor in operable communication with the ECU and being constructed and arranged to drive the at least one wheel;
an attachment assembly constructed and arranged to removably attach the ECU to at least one of a lawn mower or utility cart;
a caster frame constructed and arranged to attach to a front of at least one of a lawn mower or utility cart to facilitate steering the at least one of a lawn mower or utility cart, wherein the caster frame comprises a at least one arm extending from the caster frame and rotatably connected to at least one caster wheel bracket via a rotational joint; and
at least one caster wheel rotatably connected to the at least one caster wheel bracket.

2. A universal remote control conversion kit as in claim 1, wherein the ECU further comprises at least one memory in operable communication with the controller.

3. A universal remote control conversion kit as in claim 1, further comprising a steering motor integrated within the caster frame and caster wheel, the steering motor being in operable communication with the ECU and being constructed and arranged to turn the caster frame.

4. A universal remote control conversion kit as in claim 1, wherein the at least one drive motor is integrated within the at least one wheel.

5. A universal remote control conversion kit as in claim 1, wherein the at least one wheel is a plurality of wheels.

6. A universal remote control conversion kit as in claim 5, wherein the at least one drive motor is a plurality of drive motors integrated within the plurality of wheels.

7. A universal remote control conversion kit as in claim 1, wherein the at least one arm extending from the caster frame is a plurality of arms extending from the caster frame.

8. A universal remote control conversion kit as in claim 7, wherein the at least one caster wheel bracket is a plurality of caster wheel brackets.

9. A universal remote control conversion kit as in claim 8, wherein the at least one caster wheel is a plurality of caster wheels rotatably connected to the plurality of caster wheel brackets.

10. A universal remote control conversion kit as in claim 1, wherein the at least one power source is at least one battery.

11. A universal remote control conversion kit as in claim 1, further comprising a drive mechanism constructed and arranged to communicate at least one of drive motor power or torque to the at least one wheel.

12. A universal remote control conversion kit, comprising:
an ECU comprising ECU housing defining a cavity;
at least one power source disposed within the cavity;
at least one controller disposed within the cavity and in operable communication with the at least one power source;
at least one memory disposed within the cavity in operable communication with the controller;
a remote control in operable communication with the ECU;
at least one wheel;
at least one drive motor in operable communication with the ECU and being constructed and arranged to drive the at least one wheel via at least one drive mechanism;
an attachment assembly constructed and arranged to removably attach the ECU to at least one of a lawn mower or utility cart;
a caster frame constructed and arranged to attach to a front of at least one of a lawn mower or utility cart to facilitate steering the at least one of a lawn mower or utility cart, wherein the caster frame comprises a at least one arm extending from the caster frame and rotatably connected to at least one caster wheel bracket via a rotational joint;
at least one caster wheel rotatably connected to the at least one caster wheel bracket; and
at least one chassis constructed and arranged to facilitate attachment of the at least one wheel and caster frame to the at least one of a lawn mower or utility cart.

13. A universal remote control conversion kit as in claim 12, wherein the at least one chassis is at least two chassis.

14. A universal remote control conversion kit as in claim 13, wherein the caster frame is joined between the at least two chassis.

15. A universal remote control conversion kit as in claim 13, wherein the at least one arm extending from the caster frame is a plurality of arms extending from the caster frame.

16. A universal remote control conversion kit as in claim 13, wherein the at least one caster wheel bracket is a plurality of caster wheel brackets.

17. A universal remote control conversion kit as in claim 16, wherein the at least one caster wheel is a plurality of caster wheels rotatably connected to the plurality of caster wheel brackets.

18. A universal remote control conversion kit as in claim 13, further comprising a plurality of attachment brackets constructed and arranged to facilitate attachment of at least one chassis to at least one of a lawn mower or utility cart.

19. A universal remote control conversion kit, comprising:
    an ECU comprising ECU housing defining a cavity;
    at least one power source disposed within the cavity;
    at least one controller disposed within the cavity and in operable communication with the at least one power source;
    at least one memory disposed within the cavity in operable communication with the controller;
    a remote control in operable communication with the ECU;
    a plurality of wheels;
    a plurality of drive motors in operable communication with the ECU and being constructed and arranged to drive the plurality of wheels via at least one drive mechanism;
    an attachment assembly constructed and arranged to removably attach the ECU to at least one of a lawn mower or utility cart;
    a caster frame constructed and arranged to attach to a front of at least one of a lawn mower or utility cart to facilitate steering the at least one of a lawn mower or utility cart, wherein the caster frame comprises a at least one arm extending from the caster frame and rotatably connected to at least one caster wheel bracket via a rotational joint;
    at least one caster wheel rotatably connected to the at least one caster wheel bracket;
    at least one chassis constructed and arranged to facilitate attachment of the at least one caster wheel and caster frame to the at least one of a lawn mower or utility cart; and
    a plurality of attachment brackets constructed and arranged to facilitate attachment of at least one chassis to a lawn mower or utility cart.

20. The universal remote control conversion kit as in claim 19, wherein the universal remote control conversion kit is constructed and arranged to non-permanently convert at least one of a lawn mower or utility cart into a remote-controlled unit.

* * * * *